United States Patent

Hellman

[15] 3,640,116
[45] Feb. 8, 1972

[54] MANDREL FOR USE IN MANUFACTURING A HOLLOW ELONGATED THIN-WALLED METALLIC BODY AND METHOD OF USING SUCH MANDREL

[72] Inventor: Erik Hellman, Irsta, Sweden

[73] Assignee: Allmanna Svenska Elektriska Aktiebolaget, Vasteras, Sweden

[22] Filed: June 15, 1970

[21] Appl. No.: 46,344

Related U.S. Application Data

[62] Division of Ser. No. 734,061, June 3, 1968, Pat. No. 3,559,278.

[52] U.S. Cl....................................72/476, 72/370, 228/50
[51] Int. Cl........................................................B23k 31/02
[58] Field of Search......................72/476, 481, 370, 139, 51, 72/398, 142; 228/50; 219/59; 29/487, 447, 480, 493

[56] References Cited

UNITED STATES PATENTS

| 312,301 | 2/1885 | Starr | 72/370 |
| 2,623,550 | 12/1952 | Artoni | 72/139 |

Primary Examiner—Richard J. Herbst
Attorney—Jennings Bailey, Jr.

[57] ABSTRACT

A hollow, elongated, thin-walled body is formed by welding at least one seam to close the body around a mandrel of a material having a greater coefficient of thermal expansion than the material of the body, whereafter the body and mandrel are heated until the thermal stresses in the body are greater than the yield strength of the material of the body.

3 Claims, 4 Drawing Figures

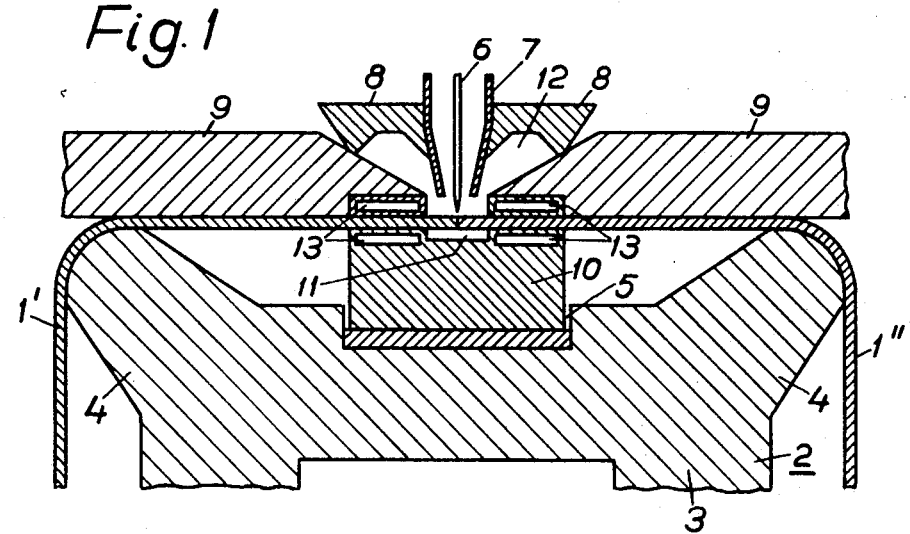
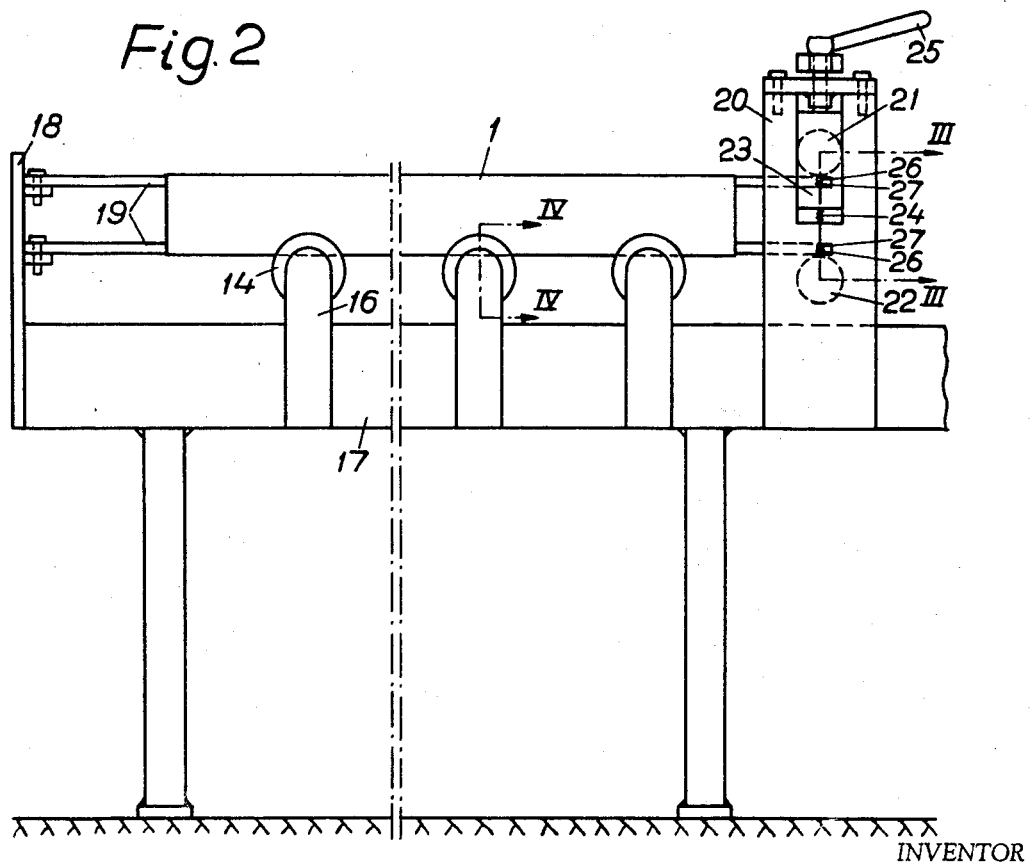

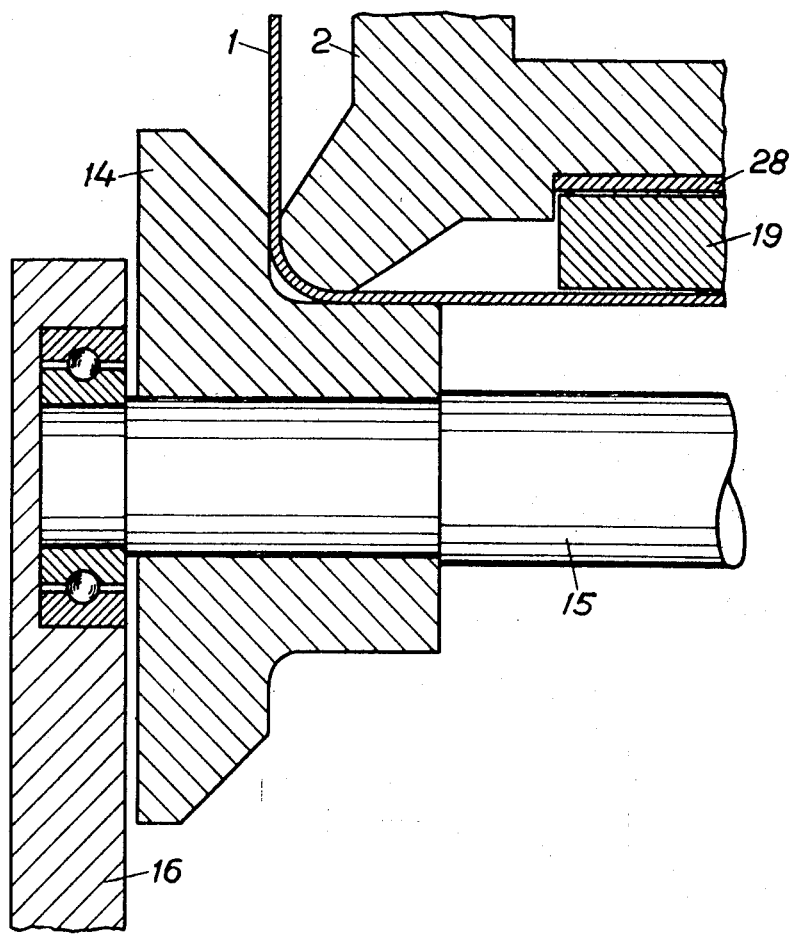

MANDREL FOR USE IN MANUFACTURING A HOLLOW ELONGATED THIN-WALLED METALLIC BODY AND METHOD OF USING SUCH MANDREL

PRIOR RELATED APPLICATIONS

This application is a division of application, Ser. No. 734,061, filed June 3, 1968, now U.S. Pat. No. 3,559,278, in the name of Sven Brandberg, Constan Glandin, and Erik Hellman. That application claims the method described herein without the inclusion of specific mandrel structure, of which method Sven Brandberg and Constan Glandin are the inventors. The present application relates to specific mandrel structure described but not claimed in application, Ser. No. 734,061, and to the method of use of such mandrel.

BACKGROUND OF THE INVENTION

1. Field of the Invention

The present invention relates to the manufacture with minimum deviation from a given basic dimension of a hollow, relatively thin-walled body having at least one cylindrical hole, the length of which is greater than the width. By "thin-walled" is meant here in the following that the ratio between the wall-thickness and the width of the hole is less than 0.1, and by "cylindrical" is meant the geometrical definition.

2. The Prior Art

In order to be able to manufacture bodies of the above-described type, for example tubes, with minimum deviation from a given basic dimension, it has previously been necessary to manufacture these from solid material by means of various processes, for example rolling, forging or drawing processes. Tubes manufactured in the above manner are usually called seamless tubes and are comparatively expensive.

Tubes having seams usually called welded tubes, regardless of how the joint has been effected, and are usually manufactured from tape-shaped material. Previously, however, these tubes have been unable to fulfill the requirements of minimum deviation from a given basic dimension but are less expensive than the seamless tubes.

SUMMARY OF THE INVENTION

One object of the invention is, without disregarding the requirement of great accuracy of dimension, to provide relatively simple equipment for manufacturing a hollow relatively thin-walled body with at least one cylindrical hole, the length of which is greater than the width. This is possible according to the invention by joining at least two parts to form said body, on a mandrel having minimum deviation from a given basic dimension, manufactured of a material having a greater coefficient of thermal expansion than the parts, and by subjecting the body fixed on the mandrel to plastic deformation by heating until thermal stresses arising in the body are greater than the yield strength of the material in the body.

The invention is particularly adapted for manufacturing metal objects which, apart from the above-mentioned characteristic features, have a high melting point and low coefficient of thermal expansion. It is also excellent for manufacturing metal tubes, such as sheathing tubes for fuel assemblies in nuclear reactors, particularly sheathing tubes with substantially circular, hexagonal or square cross section.

In order to obtain the desired accuracy of dimension when manufacturing hollow bodies by means of the above-described invention, the mandrel must have minimum deviation from a given basic dimension and be manufactured of a material having a greater coefficient of thermal expansion than the parts to be joined to form said hollow body. So that the plastic deformation can be held within a suitable temperature interval, the coefficient of thermal expansion of the mandrel should be at least 1.5 times greater, and preferably equal to or greater than 2-3 times that of the parts. Those skilled in the art will immediately perceive that there are unlimited possibilities of combing suitable materials for the parts and the mandrel. For this reason, as an example only, in the manufacture of sheathing tubes for fuel assemblies of zirconium alloys, it has been suitable to select stabilized stainless steel as the material for the mandrel, having a coefficient of linear expansion of $12-19 \cdot 10^{-6°}$ C.$^{-1}$. Another suitable material for the mandrel is an alloy consisting of 65.3 percent Fe, 25 percent Al and 9.7 percent Cr. This alloy has a constant coefficient of linear expansion of approximately $40 \cdot 10^{-6°}$ C.$^{-1}$ from 0° C. to above 1,000° C. and the advantages of its use will be indicated in the following.

In the manufacture of tubes the parts consist of structural bars which, with special reference to metal tubes, are joined together preferably by means of welding. For sheathing tubes for fuel assemblies TIG-welding (Tungsten Inert Gas) is preferably used or electron beam welding under vacuum. After joining the parts, the hollow body can be shrunk onto the mandrel by cooling and then inserted in a furnace, preferably a vertical furnace, and heated to a suitable temperature. By suitable temperature is meant the temperature at which the hollow body is plastically deformed by the mandrel to such an extent that the predetermined dimensions are obtained after cooling. For metal tubes this temperature may be stated to be 250°–950° C., for sheathing tubes of zirconium alloys suitably 500°–550° C. when a mandrel of stainless steel is used and 250°–300° C. when a mandrel of the above-mentioned iron-aluminum-chromium alloy is used. The use of a material for the mandrel which has a very high coefficient of thermal expansion enables the sheathing tube to be manufactured of cold-worked or tempered zirconium alloys which have a considerably higher yield strength than annealed alloys. This means that the wall thickness in the sheathing tubes can be decreased, with obvious advantages. Examples of the yield strength of zirconium alloys are given in Table I.

TABLE I

| Material | Treatment | Yield Strength N/mm.² | |
| | | at 20° C. | at 300° C. |
|---|---|---|---|
| Zircaloy | annealed | 300–500 | 100–150 |
| Zircaloy | cold-worked | 450–500 | 250–300 |
| Zr-2.5% Nb | tempered | approx. 700 | approx. 500 |

By Zr-2.5 percent Nb in Table I is meant a zirconium alloy containing 2.5 percent by weight niobium. The composition of Zircaloy is seen from Table II.

In certain cases it is suitable for the hollow body to be surrounded by a radially supporting casing during the heating period. The value of the coefficient of thermal expansion of the casing should in this case lie between that of the mandrel and that of the hollow body.

The heating takes place under vacuum or in a protective gas, for sheathing tubes or zirconium alloys suitably under high vacuum, that is lower pressure than $10^{-3}$ torr, or in a protective gas of helium or argon, and should be as rapid as possible in order to avoid undersired material and/or structural alterations such as, for example, grain growth. For other materials different protective gases may be selected, for example $H_2$ for W and Mo and $N_2$ for some other metals. After a preferably rapid cooling the hollow body usually detaches itself from the mandrel, or requires only slight force to be released. However, if desired a release agent may be used between the mandrel and the hollow body, for example glass or copper. When manufacturing sheathing tubes for fuel assemblies a zirconium alloy having low neutron absorption cross section is selected as the material for the tube, for example Zircaloy-4 or Zircaloy-2, the composition of which is given in Table II. When manufacturing sheathing tubes having a substantially square cross-section, two U-shaped channel parts are preferably used or four similar angular structural parts which are welded together on the mandrel to form a tube. In the same way, for hexagonal cross section two, three or six similarly shaped angular structural parts are used having such a shape that together they produce the desired cross section. In the usual manner, welding seams should be avoided at the corners. Finally, with a circular cross section, two or more structural parts are used having arc-shaped sections.

The invention is not only adapted for manufacturing long hollow bodies such as tubes, but may of course also be used for manufacturing hollow bodies too short to be regarded as tubes. In such cases the invention is particularly adapted for the manufacture of metal hollow bodies having high melting point (above 1,500° C.) and low coefficient of linear expansion (less than $10 \cdot 10^{-6}$ °C.$^{-1}$). Examples of such metals are given in Table II below.

The nozzle 7 rests through the strips 8 against the jaws 9 which are part of a fixture, not shown in detail, to keep the U-shaped structural bars 1' and 1" in position against each other. The adjacent edges of the U-shaped structural bars are supported from below by a support member 10 in the groove 5 in the mandrel 2. The support member 10 has a channel 11 running axially under the welding seam. The channel 11 can be supplied with protective gas and, together with the space 12 formed between the strips 8 and the jaws 9 which contains protective gas, contributes to producing a welding seam of high quality. On both sides of the channel 11 and in the parts of the jaws 9 situated nearest the welding seam, parallel axial

TABLE II

| | Zircaloy-2* | Zircaloy-4* | Mo | W | Ta | Nb |
|---|---|---|---|---|---|---|
| Melting point | 1,850 | 1,850 | 2,620 | 3,370 | 2,996 | 1,950 |
| Coefficient of linear expansion deg. C.$^{-1}$ | $6 \cdot 10^{-6}$ | $6 \cdot 10^{-6}$ | $4.9 \cdot 10^{-6}$ | $4.3 \cdot 10^{-6}$ | $6.5 \cdot 10^{-6}$ | $7.2 \cdot 10^{-6}$ |

*The composition of Zircaloy-2 is: Sn 1.3–1.6%, Fe 0.07 0.2%, Cr 0.05–0.15%, Ni 0.03–0.08%, Zr remainder. The composition of Zircaloy-4 is, with the following exceptions, the same as for Zircaloy-2: Fe 0.18–0.24%, Ni— (is not included as a constituent in the alloy).

Among other things, in order to reduce the number of welding seams it may be advantageous to start with a plate, for example a sheet of metal, and bend this to form an unjoined hollow body having substantially the desired cross section, and then join the hollow body by a suitable method, for example welding, on the mandrel. This means that instead of at least two parts, only one part is necessary, having two edges adjacent to each other, said edges being joined together, after which the hollow body obtained is subjected to the above-described treatment in order to obtain exact dimensions.

The joint formed by welding is preferably rolled before the heating process and while the hollow body is still on the mandrel.

While the present invention relates to the specific mandrel construction and its mode of use, the disclosure herein includes for completeness a description of the basic procedure.

BRIEF DESCRIPTION OF THE DRAWINGS

In the accompanying drawings,

FIG. 1 shows in cross section how the structural bars are welded to form a sheathing tube for a nuclear fuel assembly.

FIG. 2 shows a vertical view of equipment for simultaneously rolling two oppositely situated welding seams in a sheathing tube.

FIG. 4 shows, partly in vertical section along the line III—III in FIG. 2, a support roller in the rolling equipment.

DESCRIPTION OF THE PREFERRED EMBODIMENTS

Figure 3:
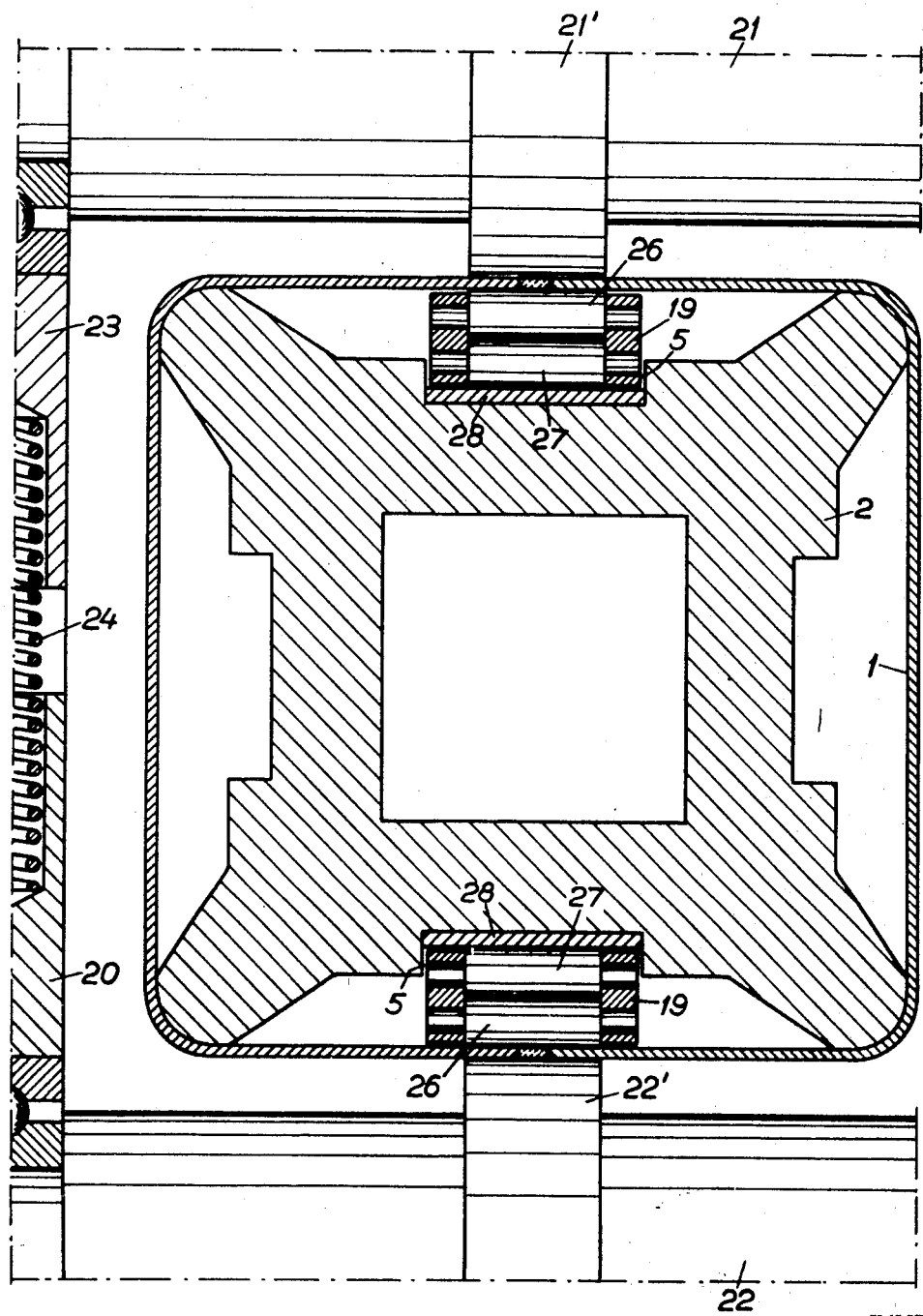
FIG. 3 shows, partly in vertical section along the line III—III in FIG. 2, how the sheathing tube shrunk on the mandrel is passed between the rollers

FIG. 1 shows how two structural bars 1' and 1" are joined by means of ITG-welding on a mandrel 2. FIG. 3 also shows the welded sheathing tube on the mandrel 2. The mandrel 2, which may be 4.5 m. long for example is manufactured with great accuracy and has a maximum deviation in straightness of 0.8 mm. and a maximum deviation as far as twisting is concerned of 0.1 mm. The mandrel 2 is shown manufactured of a stabilized stainless steel having a coefficient of linear expansion of approximately $16 \cdot 10^{-6}$ C.$^{-1}$, and is intended for the manufacture of sheathing tubes having substantially square cross section.

The mandrel is constructed of a hollow central body 3 from which four axially running ridges extend radially, said ridges having tapered cross section and rounded tops.

A groove 5 in the mandrel parallel to the ridges 4 can take up a support member which will be described below.

In the embodiment shown, two U-shaped structural bars 1' and 1" of Zircaloy are welded together to form a sheathing tube 1. In FIG. 1 a tungsten electrode, designated 6, is surrounded by a nozzle 7 for protective gas, for example argon.

channels 13 are arranged for cooling water. The coolant channels 13 are advantageously designed so that they are in yielding contact with the U-shaped sections 1' and 1" and leakage of the protective gas is thus minimized.

In order to obtain a smooth sheathing tube wall, it is suitable to roll the seam formed by welding before the sheathing tube on the mandrel is subjected to heat treatment. FIG. 2 shows a rolling means enabling the two welding seams to be rolled simultaneously.

The sheathing tube 1 surrounds the mandrel and rests on a number of supporting rollers 14 arranged in pairs and made of a suitable plastic material, for example Bakelite. As shown more clearly in FIG. 4, the support rollers 14 are arranged on shafts 15 journaled in columns 16 projecting from the stand 17. At one end of the stand 17 is a holder 18 to which two rods 19 are attached. The rods 19 are longer than the sheathing tube 1 and the mandrel 2 and rest in the grooves 5 along the entire welding seam up to two large rollers 21 and 22 arranged one on top of the other in a press stand 20. The press stand 20 is arranged approximately in the middle of the stand 17. The position of the lower roller 22 is permanent while the roller 21 is journaled in a slide 23 which is vertically movable against the spring force of the spring 24. The roller pressure is adjusted by turning the handle 25. Each rod 19 is provided with a pair of small rollers 26 and 27 arranged one above the other on the vertical line between the upper large roller 21 and the lower large roller 22. These small rollers 26 and 27 project a little outside the upper and lower surface of the rod 19 so that, when the mandrel 2 and the sheathing tube 1 are pushed forward so that the rolling process can start, the rod 19 will run in the groove 5 without being directly in contact with the bottom of the groove. During the rolling the bottom of the groove 5 may be protected by a plate 28 of tempered tool steel, which material is also suitable for the rollers 21, 22, 26 and 27. As seen in FIG. 3, the rollers 21 and 22 are provided with projecting parts 21' and 22', the width of which corresponds to the width of the rollers 26 and 27.

After rolling the sheathing tube is ready to be plastically deformed by means of the previously described heat treatment. The straightness of the tube can be even further improved by stretching it after the heat treatment.

It is obvious to one skilled in the art how the means and method described above should be modified to enable the manufacture of sheathing tubes, with, for example hexagonal or circular cross section instead of square cross section.

I claim:

1. Mandrel means for use in the manufacture of welded, high-precision sheathing tubes having substantially polygonal cross section for fuel assemblies for nuclear reactors, comprising a mandrel shaped as an elongated central body (3) from which extend a plurality of axially running ridges (4), one directed towards each corner of a polygon, and provided with at least one groove (5) running between and parallel to the ridges (4), a support member (10 or 19) engageable in said groove between a sheathing tube (1) and the mandrel (2), the thickness of said support member being substantially equal to the depth of the groove whereby the parts of the sheathing tube which are arranged between neighboring ridges are kept in the same plane when subjected to an external force, directed against the support surface of said support member, said mandrel having high precision with respect to lateral dimensions, straightness and lack of twisting about its longitudinal axis and being formed of metallic material having a high melting point and a coefficient of linear expansion which is at least $12 \cdot 10^{116} \, °C.^{-1}$.

2. Mandrel means according to claim 1, in which the metallic material is stabilized stainless steel having a coefficient of linear expansion of about $16 \cdot 10^{116} \, °C.^{-1}$.

3. Mandrel means according to claim 2, in which the metallic material is an alloy containing about 65.3 percent Fe, 25 percent Al and 9.7 percent Cr.

* * * * *